(12) United States Patent
Furusawa et al.

(10) Patent No.: US 6,339,524 B1
(45) Date of Patent: Jan. 15, 2002

(54) MERGED MR HEAD HAVING NOTCHES IN THE SIDES OF A LOWER SHIELD PEDESTAL

(75) Inventors: Hiroshi Furusawa; Mitsugu Yamasawa, both of Ibaraki (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/662,227

(22) Filed: Sep. 14, 2000

Related U.S. Application Data

(62) Division of application No. 09/111,931, filed on Jul. 8, 1998, now Pat. No. 6,141,857.

(30) Foreign Application Priority Data

Jul. 8, 1997 (JP) .............................................. 9-182279

(51) Int. Cl.[7] ................................................ G11B 5/39
(52) U.S. Cl. ...................................................... 360/317
(58) Field of Search .................................. 360/317, 126

(56) References Cited

U.S. PATENT DOCUMENTS

| 5,438,747 A | 8/1995 | Krounbi et al. ................ 29/603 |
| 5,578,342 A | 11/1996 | Tran et al. .................. 427/131 |
| 5,751,526 A | * 5/1998 | Schemmel ................... 360/113 |
| 6,072,672 A | * 6/2000 | Westwood ................... 360/126 |

FOREIGN PATENT DOCUMENTS

| JP | 2-254611 | 10/1990 |
| JP | 3-147508 | 6/1991 |
| JP | 7-262519 | 10/1995 |
| JP | 9-102106 | 4/1997 |
| JP | 10-112007 | 4/1998 |
| JP | 10-143817 | 5/1998 |

* cited by examiner

*Primary Examiner*—George J. Letscher
(74) *Attorney, Agent, or Firm*—Young & Thompson (57) ABSTRACT

A merged MR head is formed by sequentially stacking a lower shield, a lower shield gap, a magnetoresistive (MR) element, an upper shield gap, a lower magnetic pole/upper shield, a recording gap layer, a coil, a coil insulating layer, and an upper magnetic pole on a side surface of a trailing edge of a floating slider having an air bearing surface. This merged MR head includes a pedestal which is formed on a portion on the lower magnetic pole/upper shield, including the air bearing surface, to have a width larger than that of the upper magnetic pole. The upper magnetic pole is stacked on the pedestal through the recording gap layer. A sidewall of the pedestal in the vicinity of the air bearing surface has a notch which is obtained by forming a plane where a sidewall of the upper magnetic pole is present. A method of manufacturing this merged MR head is also disclosed.

10 Claims, 6 Drawing Sheets

MERGED MR HEAD HAVING NOTCHES IN THE SIDES OF A LOWER SHIELD PEDESTAL

CROSS-REFERENCE TO RELATED APPLICATIONS

This application is a division of application Ser. No. 09/111,931, filed Jul. 8, 1998 U.S. Pat. No. 6,141,821.

BACKGROUND OF THE INVENTION

The present invention relates to a merged MR (magnetoresistive) head having aligned magnetic pole tips, and a method of manufacturing the same.

In a magnetic disk drive, data is read and written by using a magnetic disk medium serving as a storage medium, and a magnetic head having a electromagnetic transducing element mounted on a floating slider floating and supported by the air bearing effect caused by high-speed rotation of the magnetic disk medium.

Recent demands for an internal storage unit or external storage unit of a personal computer and the like increase remarkably, and downsizing, a higher operation speed, and a higher recording density are strongly demanded in a magnetic disk drive.

For this reason, improvements for high performance have been made in the magnetic head serving as the major portion of the magnetic disk drive, the magnetic disk medium, positioning servo, signal processing, and the like. In particular, whereas the magnetic head conventionally performs write (recording) and read (play) with one electromagnetic transducing element, recently, use of a so-called write/read separation type merged MR head is becoming the main stream. The merged MR head uses a conventional inductive element for data write, and an MR element, the output of which does not depend on the speed relative to the magnetic disk medium and which utilizes the magnetoresistive effect, for data read. These two elements are integrated and mounted on one floating slider.

This merged MR head is manufactured by utilizing photolithography technique, and micropatterning technique similar to a semiconductor manufacturing process. For example, Japanese Patent Laid-Open No. 7-262519 (U.S. Pat. No. 5,438,747) discloses a merged MR head and a technique concerning a method of manufacturing the same.

Figure 5A:
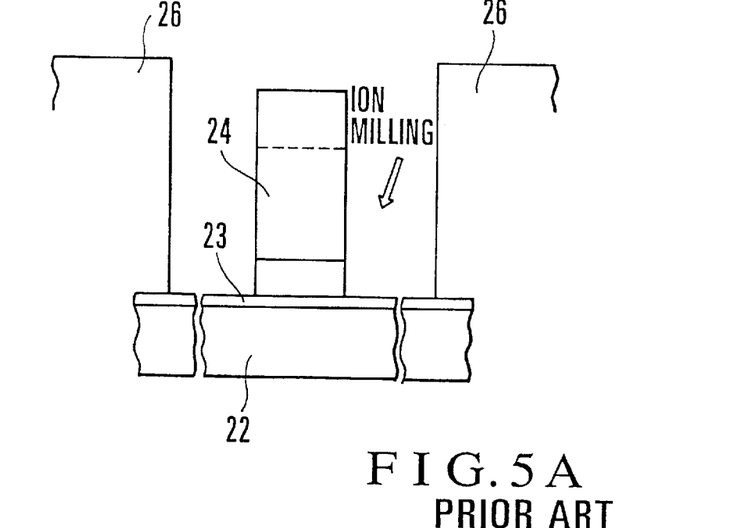
FIGS. 5A to 5C are views showing the steps in an example of a method of manufacturing a conventional merged MR head.
Figure 5B:
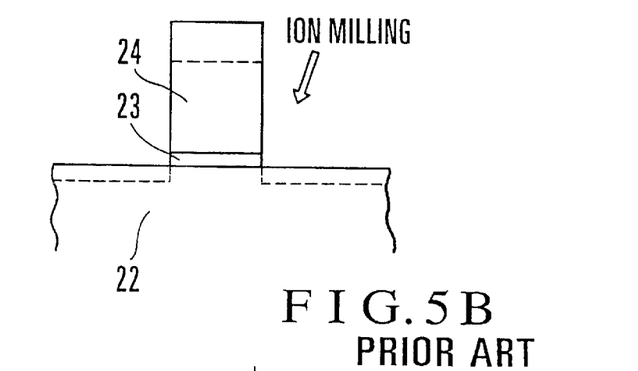
Figure 5C:
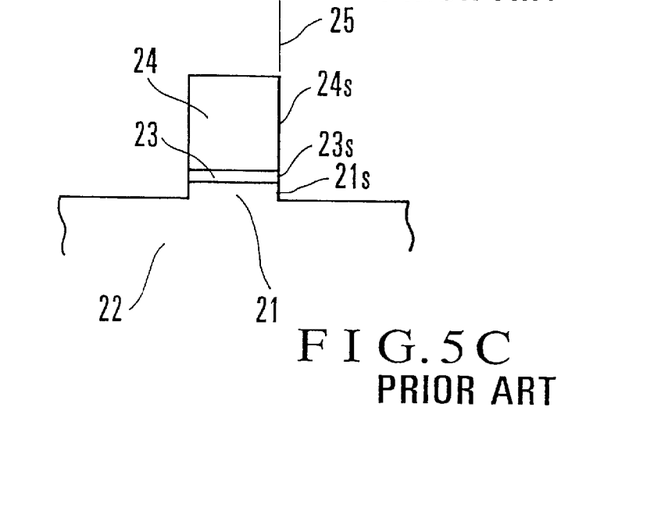

FIGS. 5A to 5C show an example of a method of manufacturing a conventional merged MR head.

In order to decrease the side fringe magnetic field generated during recording, the conventional merged MR head has a recording gap layer having the same width as that of an upper magnetic pole and a sidewall aligned with the same plane where the side surface of the upper magnetic pole is present, and the pedestal of a lower magnetic pole/upper shield.

In the method of manufacturing a conventional merged MR head, the recording gap layer and the pedestal of the lower magnetic pole/upper shield are formed to have the same width as that of the upper magnetic pole. For this purpose, the recording gap layer is defined to have the same width as that of the upper magnetic pole by using ion milling and chemical etching. Subsequently, in accordance with ion milling, the pedestal of the lower magnetic pole/upper shield, having the same width as that of the upper magnetic pole and a side surface aligned with the same vertical plane where the side surface of the upper magnetic pole is present, is formed on the lower magnetic pole/upper shield by using the upper magnetic pole as the mask.

FIGS. 5A to 5C show the manufacturing method which uses ion milling when defining the recording gap layer to have the same width as that of the upper magnetic pole. A recording gap layer 23 is deposited on a lower magnetic pole/upper shield 22, and thereafter an upper magnetic pole 24 is formed on the recording gap layer 23 by electroplating using photoresist frame. A portion of the resultant structure other than the vicinity of the upper magnetic pole 24 is covered with a photoresist 26, and the recording gap layer 23 is defined by ion milling to have the same width as that of the upper magnetic pole 24.

Since the ion beam etching rate of the recording gap layer 23 is lower than the ion beam etching rate of the upper magnetic pole 24, when defining the recording gap layer 23 to have the same width as that of the upper magnetic pole 24, the thickness (height) of the upper magnetic pole 24 decreases largely. More specifically, FIG. 5A shows a state before the recording gap layer 23 is etched by ion milling, and FIG. 5B shows a state after the recording gap layer 23 is defined by ion milling by using the upper magnetic pole 24 as the mask (the broken line in FIG. 5B shows a portion to be etched by ion milling). In FIG. 5B, the thickness of the upper magnetic pole 24 is apparently smaller than that in FIG. 5A.

Subsequently, as shown in FIG 5C, a pedestal 21 for the lower magnetic pole/upper shield 22 is formed on the lower magnetic pole/upper shield 22 in accordance with ion milling by using the upper magnetic pole 24 as the mask. The pedestal 21 has the same width as that of the upper magnetic pole 24 and is aligned with the same vertical plane where a sidewall or surface 24s of the upper magnetic pole 24 is present. In this case, the thickness of the upper magnetic pole 24 further decreases.

In other words, FIG. 5B shows a state before the pedestal 21, aligned with the same vertical plane where the side surface of the upper magnetic pole 24 is present, is defined on the lower magnetic pole/upper shield 22 in accordance with ion milling by using the upper magnetic pole 24 as the mask. FIG. 5C shows a state after the pedestal 21 is defined on the lower magnetic pole/upper shield 22 by using the upper magnetic pole 24 as the mask.

In FIG. 5C, the sidewall 24s of the upper magnetic pole 24, a sidewall 23s of the recording gap layer 23, and a sidewall 21s of the pedestal 21 are aligned within the same plane 25. Similarly, the respective sidewalls on the opposite side (the left-hand side in FIG. 5C) are aligned within the same plane.

Figure 6A:
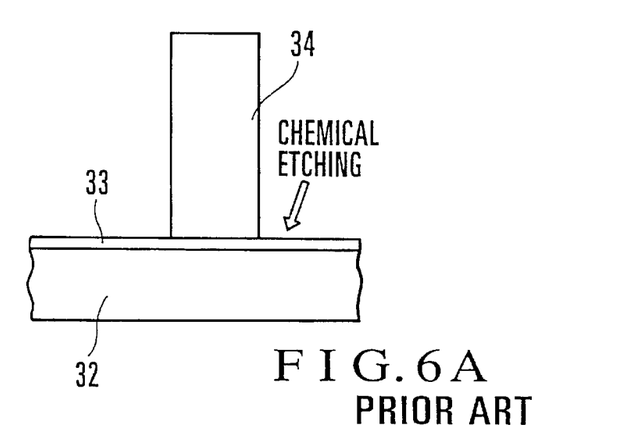
FIGS. 6A to 6C are views showing the steps in another example of a method of manufacturing a conventional merged MR head.
Figure 6B:
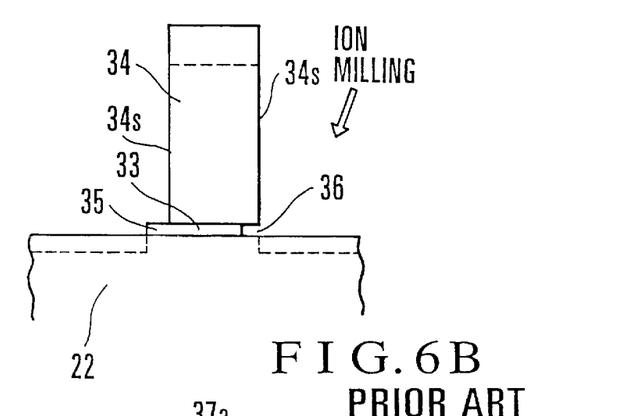
Figure 6C:
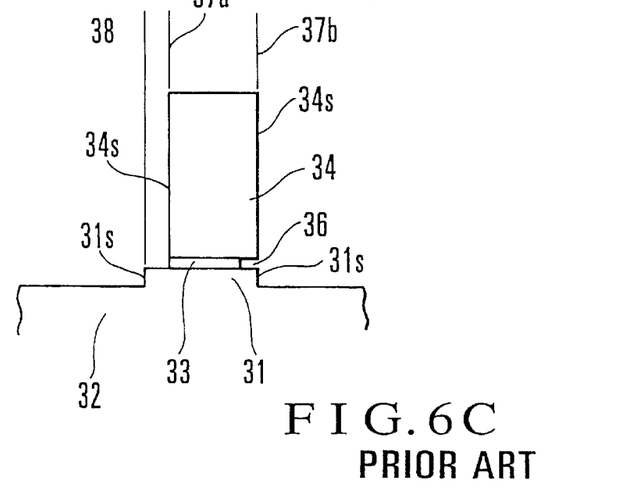

FIGS. 6A to 6C show another example of a conventional merged MR head and a method of manufacturing the same.

A recording gap layer 33 is formed on a lower magnetic pole/upper shield 32, and thereafter an upper magnetic pole 34 is formed on the recording gap layer 33 by electroplating using photoresist frame. Subsequently, the recording gap layer 33 is defined to have the same width as that of the upper magnetic pole 34 by chemical etching.

In this case, since a chemical etching solution that etches not the upper magnetic pole 34 but the recording gap layer 33 can be selected, the thickness (height) of the upper magnetic pole 34 does not decrease. Subsequently, a pedestal 31 for the lower magnetic pole/upper shield 32 is formed on the lower magnetic pole/upper shield 32 in accordance with ion milling by using the upper magnetic pole 34 as the mask. The pedestal 31 has the same width as that of the upper magnetic pole 34 and is aligned with the same vertical plane as the side surface of the upper magnetic pole 34. In this case, the thickness of the upper magnetic pole 34 decreases (the broken line in FIG. 6B shows a portion to be etched by ion milling).

In the conventional merged MR head manufacturing methods described above, the thickness of the upper magnetic pole becomes undesirably smaller than the thickness necessary to generate a sufficiently strong magnetic field when the merged MR head records a signal on the magnetic recording medium.

The reason for this is as follows. When forming the recording gap layer and the pedestal of the lower magnetic pole/upper shield by ion milling in order to decrease the side fringe magnetic field, the upper magnetic pole serving as the mask during ion milling must be formed thicker in advance by an amount corresponding to the thickness decreased by ion milling. For this purpose, the photoresist required for forming the upper magnetic pole by electroplating using photoresist frame must be formed to have a thickness larger than that of the necessary upper magnetic pole and to have a desired width of the upper magnetic pole. However, as the width of the upper magnetic pole decreases to meet a demand for a higher density, such a photoresist becomes difficult to form.

In the former case, since the ion beam etching rate of the recording gap layer 23 is lower than the ion beam etching rate of the upper magnetic pole 24, when defining the recording gap layer 23 to have the same width as that of the upper magnetic pole 24, the thickness of the upper magnetic pole 24 decreases largely. In other words, the thickness of the upper magnetic pole 24 decreases largely in accordance with the procedure from FIG. 5A to FIG. 5B.

When forming the pedestal 21 for the lower magnetic pole/upper shield 22 by ion milling using the upper magnetic pole 24 as the mask, the thickness of the upper magnetic pole 24 further decreases. As a result, the thickness of the upper magnetic pole, which is necessary to generate a sufficiently strong magnetic field when recording a signal on the magnetic recording medium, may not be ensured.

In particular, when the width of the upper magnetic pole 24 becomes equal to or less than 2 $\mu$m, the thickness of the upper magnetic pole 24 that can be formed by electroplating using photoresist frame is about 5 $\mu$m at maximum. Therefore, when ion milling is performed for the recording gap layer 23 and the pedestal 21 portion for the lower magnetic pole/upper shield 22 by using the upper magnetic pole 24 as the mask, the thickness of the upper magnetic pole 24 becomes equal to or less than 3 $\mu$m, which is smaller than the required thickness, 4 $\mu$m.

In the latter case, the sidewall of the recording gap layer and the sidewall for the pedestal of the lower magnetic pole/upper shield cannot be formed on the same plane where the sidewall of the upper magnetic pole is present.

The reason for this is as follows. Assume that in order to avoid the problems of the former case, the recording gap layer is to be formed by chemical etching to have the same width as that of the upper magnetic pole and to have a sidewall within the same vertical plane where the sidewall of the upper magnetic pole is present. In this case, due to variations in chemical etching rate, it is difficult to stop etching as soon as the sidewall of the recording gap layer becomes located on the same plane where the sidewall of the upper magnetic pole is present.

More specifically, due to variations in etching rate of the recording gap layer 33 etched with a chemical etching solution, it is difficult to stop chemical etching as soon as the side surface of the recording gap layer 33 reaches the same plane 37a or 37b where a side surface or wall 34s of the upper magnetic pole 34 is present. As a result, as shown in FIG. 6B, the side surface of the recording gap layer 33 undesirably extends to the outer side of the same plane 37a where the sidewall 34s of the upper magnetic pole 34 is present, thus forming an etch residue 35, or the side surface of the recording gap layer 33 undesirably retreats backward to the inner side of the same plane 37b where the sidewall 34s of the upper magnetic pole 34 is present, thus causing an over-etching 36.

In the etch residue 35 portion, the over-extending recording gap layer 33 forms a mask. As shown in FIG. 6C, a sidewall 31s (on the left in FIG. 6C), on the opposite side, of the pedestal 31 for the lower magnetic pole/upper shield 32 is formed on a plane 38 on the outer side of the same plane 37a where the sidewall 34s of the upper magnetic pole 34 is present. Accordingly, the side fringe magnetic field is not decreased.

Furthermore, in a portion of the recording gap layer 33 where the over-etching 36 has occurred, the sidewall 31s of the pedestal 31 for the lower magnetic pole/upper shield 32 can be formed on the same planes 37a and 37b where the sidewall 34s of the upper magnetic pole 34 is present. However, the over-etching 36 portion of the recording gap layer 33 is not filled even in the later steps but is left as a hole. A foreign matter may enter through this hole to reach an element portion covered with a protection film, to corrode the element.

SUMMARY OF THE INVENTION

It is an object of the present invention to provide a merged MR head in which the upper magnetic pole is formed to have a width equal to or less than 2 $\mu$m to perform high-density magnetic recording, and a method of manufacturing the same.

It is another object of the present invention to provide a merged MR head in which the sidewall of the upper magnetic pole and the sidewall of the pedestal for the lower magnetic pole/upper shield are aligned on the same plane, and a method of manufacturing the same.

In order to achieve the above objects, according to the present invention, there is provided a merged MR head formed by sequentially stacking a lower shield, a lower shield gap, a magnetoresistive (MR) element, an upper shield gap, a lower magnetic pole/upper shield, a recording gap layer, a coil, a coil insulating layer, and an upper magnetic pole on a side surface of a trailing edge of a floating slider having an air bearing surface, wherein the merged MR head comprises a pedestal which is formed on a portion on the lower magnetic pole/upper shield, including the air bearing surface, to have a width larger than that of the upper magnetic pole, the upper magnetic pole being stacked on the pedestal through the recording gap layer, and a sidewall of the pedestal in the vicinity of the air bearing surface has a notch which is obtained by forming a plane where a sidewall of the upper magnetic pole is present.

DESCRIPTION OF THE PREFERRED EMBODIMENTS

The present invention will be described in detail with reference to the accompanying drawings.

Figure 1A:
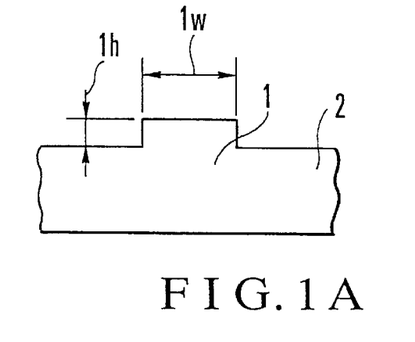
FIGS. 1A to 1F are views showing the steps in manufacturing a merged MR head according to the first embodiment of the present invention, in which the shape of a magnetic pole tip seen from a side corresponding to the air bearing surface of a merged MR head element is shown in the order of manufacturing steps.
Figure 1B:
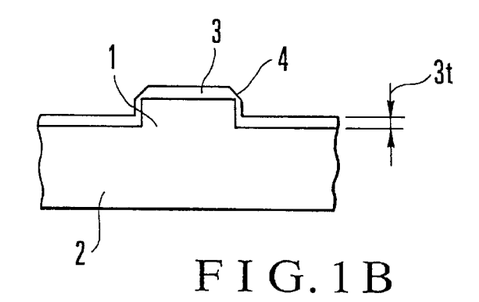
Figure 1C:
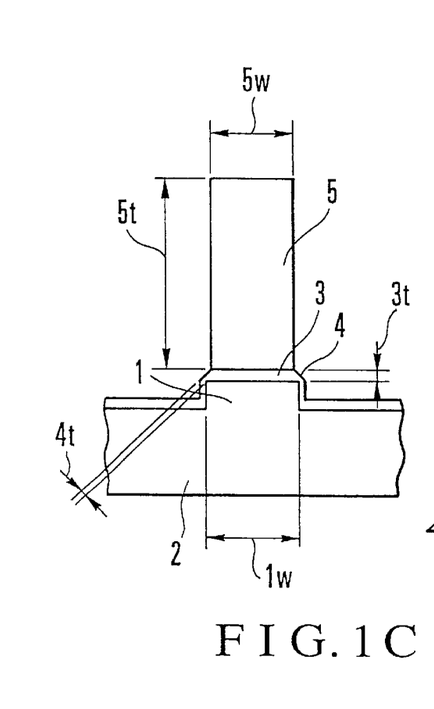
Figure 1D:
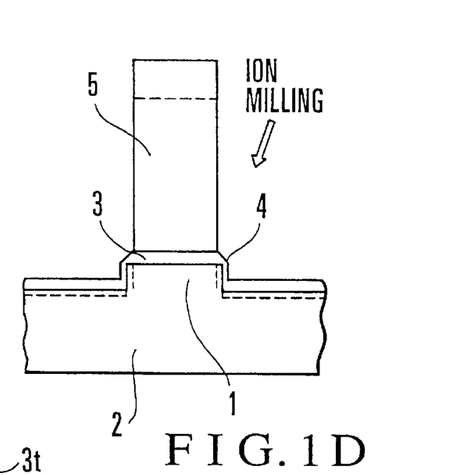
Figure 1E:
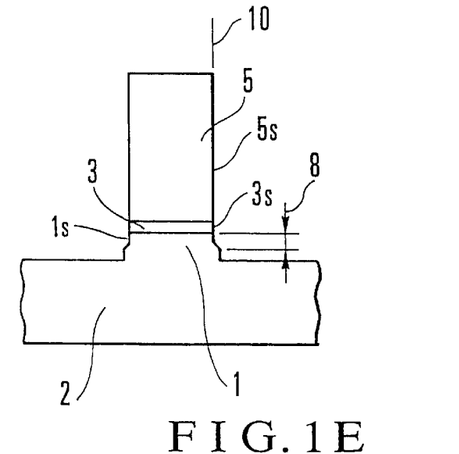
Figure 1F:
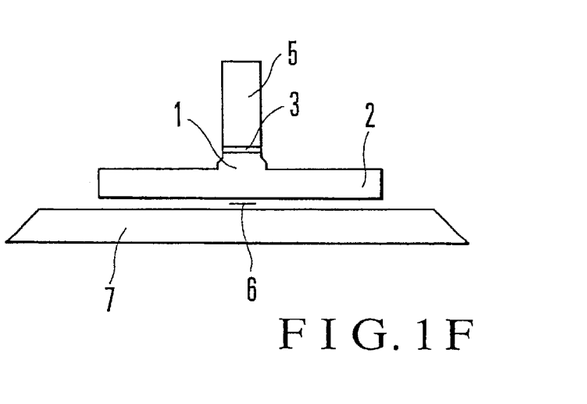

FIGS. 1A to 1F show the steps in a method of manufacturing a merged MR head according to an embodiment of the present invention. In FIGS. 1A to 1E, the shape of a portion above a lower magnetic pole/upper shield 2 is shown in the order of manufacturing steps. FIG. 1F shows the shape of a magnetic pole tip seen from a surface corresponding to the air bearing surface of a completed merged MR head.

To obtain this merged MR head, as shown in FIG. 1F, a lower shield 7 is formed, an MR element 6 is formed, and thereafter the lower magnetic pole/upper shield (to be referred to as the upper shield hereinafter) 2 is formed. After formation of the upper shield 2, a pedestal for the lower magnetic pole/upper shield (to be referred to as a pedestal hereinafter) 1, having a width 1$w$ slightly larger than the width (5$w$) of an upper magnetic pole 5 and a height 1$h$ equal to or larger than the recording gap layer thickness (3$t$), is selectively formed on the upper shield 2 (FIG. 1A).

A recording gap layer 3 having a thickness 3$t$ is formed on the upper shield 2 and pedestal 1. Since the upper shield 2 has the pedestal 1, the thickness of the recording gap layer 3 on the corner of the pedestal 1, i.e., the thickness of a corner 4, becomes smaller than the recording gap layer thickness 3$t$ (FIG. 1B).

A lower insulating layer, a coil, and an upper insulating layer (latter two are not shown) that constitute the merged MR head are formed. In this formation, the thickness of the recording gap layer corner 4 is further decreased. Subsequently, the upper magnetic pole 5 having a thickness 5$t$ and the width 5$w$ is formed on the recording gap layer 3 in the pedestal 1 region by electroplating using photoresist frame (FIG. 1C).

By using the upper magnetic pole 5 as the mask, the recording gap layer 3 and the pedestal 1 are notched (removed) by ion milling to have the same width as the width 5$w$ the upper magnetic pole 5 (FIG. 1D). In FIG. 1D, the broken line indicates a portion to be etched by ion milling. As a result, a sidewall 5$s$ of the upper magnetic pole 5, a sidewall 3$s$ of the recording gap layer 3, and a sidewall 1$s$ of the pedestal 1 are formed within the same plane 10 (FIG. 1E).

The structure of a merged MR head having a floating slider with an air bearing surface, and a coil and a coil insulating layer stacked on the floating slider is described in Japanese Patent Laid-Open No. 7-262519 (U.S. Pat. No. 5,438,747), and a description thereof will be omitted accordingly. The structure of the merged MR head described in this reference is incorporated in this embodiment.

The steps of FIGS. 1A to 1F described above will be individually described in detail.

Referring to FIG. 1A, the width 1$w$ of the pedestal 1 is formed to be slightly larger than the width 5$w$ of the upper magnetic pole 5 so that, even if the position of the photoresist frame used when forming the upper magnetic pole 5 by electroplating using photoresist frame may slightly vary, the end of the photoresist frame is formed on the pedestal 1. When considering these variations, the width 1$w$ of the pedestal 1 is preferably larger than the width 5$w$ of the upper magnetic pole 5 by 0.1 $\mu$m to 2.0 $\mu$m, and is particularly most preferably larger by 1.0 $\mu$m. With this size, the corner 4 is exposed beside the lower portion of the upper magnetic pole 5.

The height 1$h$ of the pedestal 1 is preferably larger than the recording gap layer thickness 3$t$. For example, when the recording gap layer thickness 3$t$ falls within the range of 0.1 82 m to 0.5 $\mu$m, the height 1$h$ of the pedestal 1 preferably falls within the range of 0.1 $\mu$m to 2 $\mu$m. In particular, the height 1$h$ of the pedestal 1 is preferably equal to or larger than twice the recording gap layer thickness 3$t$. For example, when the recording gap layer thickness 3$t$ is 0.3 $\mu$m to 0.4 $\mu$m, the height 1$h$ of the pedestal 1 is preferably equal to or larger than 1.0 $\mu$m.

This is because it facilitates formation of a notched portion height 8 of the pedestal 1, having the sidewall 1$s$ aligned within the same plane where the sidewall 5$s$ of the upper magnetic pole 5 is present, to be equal to or larger than twice the recording gap layer thickness 3$t$.

Referring to FIG. 1B, since a step formed by the pedestal 1 is present on the upper shield 2, a thickness 4$t$ of the recording gap layer corner 4 on the corner of the pedestal 1 becomes smaller than the recording gap layer thickness 3$t$ on the pedestal 1. For example, when the recording gap layer thickness 3$t$ falls within the range of 0.3 $\mu$m to 0.4 $\mu$m, the thickness 4$t$ of the recording gap layer corner 4 is decreased to 0.2 $\mu$m to 0.1 $\mu$m.

Referring to FIG. 1C, after the upper magnetic pole 5 is formed by electroplating using photoresist frame, the photoresist that has served as the frame is removed. When the width 5$w$ of the upper magnetic pole 5 is equal to or smaller than 2 $\mu$m, the thickness 5$t$ of the upper magnetic pole 5 can be formed to as small as 5 $\mu$m at maximum. This is because when the upper magnetic pole 5 is to be formed by electroplating using photoresist frame, the thickness of the photoresist, that serves as the frame when forming the width 5$w$ of the upper magnetic pole 5 to be equal to or smaller than 2 $\mu$m, can be formed to as small as 5 $\mu$m at maximum.

In other words, if the thickness of the thinnest portion of the photoresist that serves as the frame is set to be equal to or larger than 5 $\mu$m, the thickness of a portion of the photoresist corresponding to a 5$w$-width portion of the upper magnetic pole 5 becomes equal to or larger than 10 $\mu$m, and the width 5$w$ of the upper magnetic pole 5 cannot be formed to be equal to or smaller than 2 $\mu$m accordingly.

In the steps of forming the lower insulating layer, the coil, and the upper insulating layer, the thickness 4$t$ of the recording gap layer corner 4 is decreased to about ⅕ to ⅙ the recording gap layer thickness 3$t$ due to ion milling which is practiced when forming the coil. For example, when the recording gap layer thickness 3$t$ is 0.3 $\mu$m to 0.4 $\mu$m, the thickness 4t of the recording gap layer corner 4 is decreased to 0.08 μm to 0.05 μm.

This is due to the following reason. When performing ion milling to form the coil, in order to remove the film between the coils, an ion beam is made incident in a direction perpendicular, or close to perpendicular, to the upper shield 2. Because of the presence of the pedestal 1, the surface of the recording gap layer corner 4 is obliquely inclined, as shown in FIG. 1B, and the ion beam comes incident on the recording gap layer corner 4 obliquely.

When the recording gap layer 3 is made of, e.g., aluminum oxide, the ion milling rate for aluminum oxide is larger in oblique incidence of the ion beam than in perpendicular incidence. As a result, the recording gap layer corner 4 is etched in a larger amount than the recording gap layer 3 on the upper shield 2.

Since the width 1w of the pedestal 1 is slightly larger than the width 5w of the upper magnetic pole 5, the recording gap layer corner 4 is exposed under the right and left sidewalls of the upper magnetic pole 5.

Referring to FIGS. 1D and 1E, the recording gap layer 3 and the pedestal 1 are defined to have the same width as that of the upper magnetic pole 5 by ion milling using the upper magnetic pole 5 as the mask. In this case, of the recording gap layer 3 which is etched by ion milling, a portion corresponding to the corner of the pedestal 1 formed to have the width 1w slightly larger than the width 5w of the upper magnetic pole 5 slightly extends horizontally from the upper magnetic pole 5, so that the recording gap layer corner 4 is exposed laterally at the lower portion of the sidewall 5s of the upper magnetic pole 5. Accordingly, the width of the recording gap layer 3 can be defined to the thickness 5t of the upper magnetic pole 5 by only etching the recording gap layer corner 4 which has a thickness ⅕ to ⅙ the recording gap layer thickness 3t on the pedestal 1.

In particular, when the width 1w of the pedestal 1 is formed to be larger than the width 5w of the upper magnetic pole 5 by 0.1 μm to 2.0 μm, the recording gap layer corner 4 can be exposed laterally at the lower portion of the sidewall 5s of the upper magnetic pole 5. When the width 1w of the pedestal 1 is formed to be larger than the width 5w of the upper magnetic pole 5 by 1.0 μm, the recording gap layer corner 4 can be exposed laterally at the lower portion of the sidewall 5s of the upper magnetic pole 5 most reliably.

More specifically, before deposition of the recording gap layer 3, the pedestal 1 is formed to have a width slightly larger than the width 5w of the upper magnetic pole 5, so that the recording gap layer corner 4 having a thickness ⅕ to ⅙ the recording gap layer thickness 3t on the pedestal 1 can be exposed laterally at the lower portion of the sidewall 5s of the upper magnetic pole 5. Accordingly, the ion milling time required for defining the recording gap layer 3 to have the width 5w of the upper magnetic pole 5 by ion milling using the upper magnetic pole 5 as the mask can be decreased to ⅕ to ⅙ the conventionally required time. As a result, the amount of decrease in thickness 5t of the upper magnetic pole 5, obtained when defining the recording gap layer 3 to have the width 5w of the upper magnetic pole 5 by ion milling, can be decreased to ⅕ to ⅙ the conventionally required amount.

Referring to FIG. 1E, after the recording gap layer 3 is defined to have the width 5w of the upper magnetic pole 5 by ion milling, the pedestal 1 is sequentially defined to have the width 5w of the upper magnetic pole 5 by ion milling using the upper magnetic pole 5 as the mask.

In this manner, when the recording gap layer 3 and the pedestal 1 are defined in accordance with ion milling by using the upper magnetic pole 5 as the mask, the sidewall 5s of the upper magnetic pole 5, the sidewall 3s of the recording gap layer 3, and the sidewall 1s of the notched portion of the pedestal 1 can be formed within the same plane 10.

When defining the pedestal 1 and recording gap layer 3 to have the width 5w of the upper magnetic pole 5 by using the upper magnetic pole 5 as the mask, the height 8 of the notched portion of the pedestal 1 is preferably formed to be equal to or larger than twice the recording gap layer thickness 3t. This is because it can decrease widening of the fringe magnetic field during recording.

The amount of decrease in thickness of the upper magnetic pole 5, obtained when defining the recording gap layer 3 and the pedestal 1 by ion milling using the upper magnetic pole 5 as the mask, is the sum of the amount of decrease obtained when removing the recording gap layer 3 and the amount of decrease obtained when notching the pedestal 1 for the lower magnetic pole/upper shield 2 to have the same width as that of the upper magnetic pole 5. When the recording gap layer thickness 3t is 0.3 μm to 0.4 μm, the amount of decrease in thickness of the upper magnetic pole 5, obtained when removing the recording gap layer 3, is about 0.1 μm to 0.2 μm when calculated on the basis of the thickness of the remaining recording gap layer 3 (⅕ to ⅙ the initial value) and the rate ratio (about twice) in ion milling of the material of the recording gap layer to the material of the magnetic pole.

The amount of decrease in thickness of the upper magnetic pole 5, obtained when notching the pedestal 1, is 0.6 μm to 0.8 μm when the notched portion height 8 is set to equal or larger than twice that of the recording gap layer 3. Accordingly, when the thickness of the initial upper magnetic pole 5 is 5 μm, the thickness of the upper magnetic pole 5, after the recording gap layer 3 and pedestal 1 are defined by ion milling and the pedestal 1 is notched to have the same width as that of the upper magnetic pole 5, is 4.0 μm to 4.3 μm.

When the method of manufacturing the merged MR head described above is employed, a merged MR head satisfying all the following conditions can be provided:

(1) the width 5w of the upper magnetic pole 5 is equal to or smaller than 2 μm and the thickness of the upper magnetic pole 5 is equal to or larger than 4.0 82 m;

(2) the recording gap layer thickness 3t falls within the range of 0.1 μm to 0.4 μm;

(3) the sidewall 3s of the recording gap layer 3 and the sidewall 1s of the notched portion of the pedestal 1 are aligned within the same plane where the sidewall 5s of the upper magnetic pole 5 is present; and (4) the height of the sidewall 1s of the notched portion of the pedestal 1 falls within the range of 0.5 to 4 times the recording gap layer thickness 3t of the recording gap layer 3 having the same width as the width 5w of the upper magnetic pole 5.

In particular, a merged MR head satisfying all the following preferable conditions can be provided:

(1) the width 5w of the upper magnetic pole 5 is equal to or smaller than 2 μm and the thickness of the upper magnetic pole 5 is equal to or larger than 4.0 μm;

(2) the recording gap layer thickness 3t falls within the range of 0.3 μm to 0.4 μm;

(3) the sidewall 3s of the recording gap layer 3 and the sidewall 1s of the notched portion of the pedestal 1 are aligned within the same plane where the sidewall 5s of the upper magnetic pole 5 is present; and (4) the height 8 of the notched portion, which is formed by notching the sidewall is of the notched portion of the pedestal 1 to have the same width as the width 5w of the upper magnetic pole 5, is 0.6 μm to 0.8 μm or is larger than 0.8 μm.

FIGS. 2A to 2E show a method of manufacturing a merged MR head according to the second embodiment of the present invention. In FIGS. 2A to 2E, portions that are identical to those of FIGS. 1A to 1F are denoted by the same reference numerals as in FIGS. 1A to 1F, and a description thereof will be omitted.

Figure 2A:
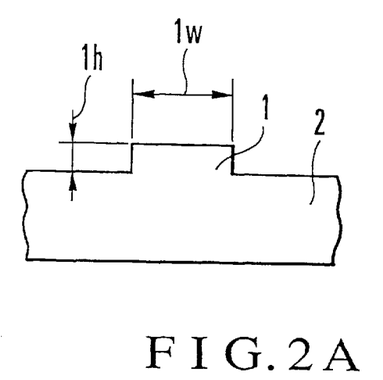
FIGS. 2A to 2E are views showing the steps in manufacturing a merged MR head according to the second embodiment of the present invention, in which the shape of a magnetic pole tip seen from a side corresponding to the air bearing surface of the merged MR head element is shown in the order of manufacturing steps.
Figure 2B:
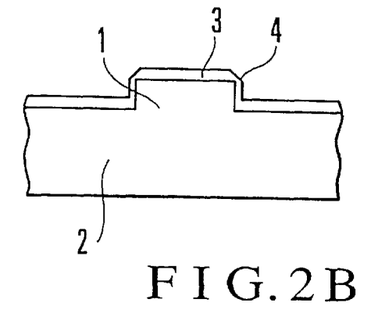
Figure 2C:
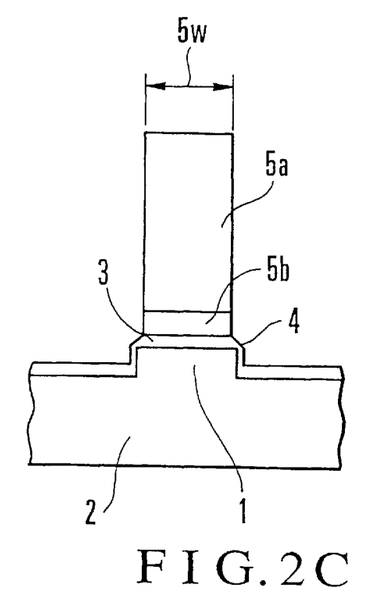
Figure 2D:
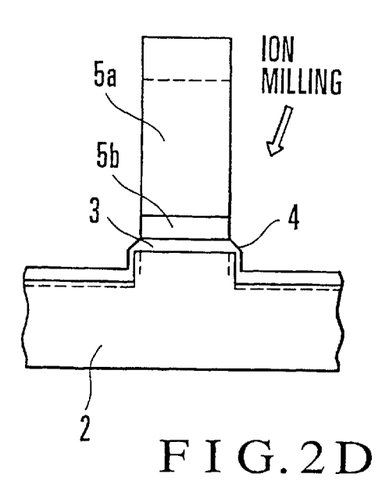
Figure 2E:
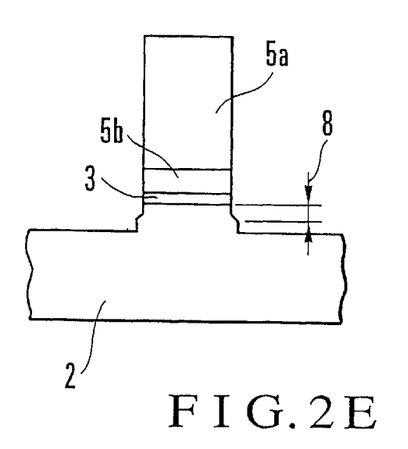

As shown in FIGS. 2C to 2E, the upper magnetic pole of this embodiment is formed by stacking two members, i.e., upper magnetic poles 5a and 5b. The upper magnetic pole 5b on the recording gap layer 3 side is made of, e.g., a material having a higher saturation magnetic flux density than that of a nickel-iron alloy. More specifically, a cobalt-nickel-iron alloy, a cobalt-tantalum-zirconium alloy, a cobalt-niobium-zirconium alloy, iron nitride, or an iron-aluminum-silicon alloy is used.

In this embodiment, after the recording gap layer 3 is formed on a pedestal 1 for an upper shield 2 in FIGS. 2A and 2B, the two upper magnetic poles 5b and 5a are sequentially stacked on the recording gap layer 3 in the pedestal 1 region by using a predetermined material. FIGS. 2D and 2E show steps identical to those shown in FIGS. 1E and 1D, and a detailed description thereof will thus be omitted.

FIGS. 3A to 3E show a method of manufacturing a merged MR head according to the third embodiment of the present invention.

The upper magnetic pole of this embodiment is constituted by two members, i.e., upper magnetic poles 5a and 5b, in the same manner as in the second embodiment. The upper magnetic pole 5b on the recording gap layer 3 side is made of, e.g., a material having a higher saturation magnetic flux density than that of a nickel-iron alloy. More specifically, a cobalt-nickel-iron alloy, a cobalt-tantalum-zirconium alloy, a cobalt-niobium-zirconium alloy, iron nitride, or an iron-aluminum-silicon alloy is used.

Figure 3A:
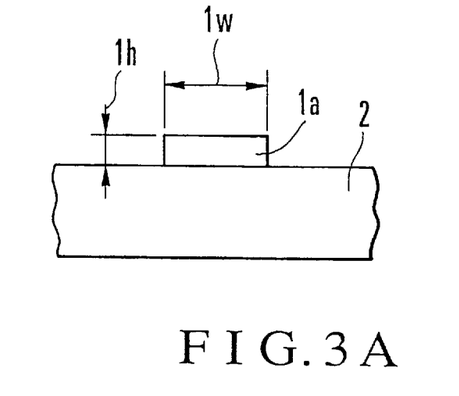
FIGS. 3A to 3E are views showing the steps in manufacturing a merged MR head according to the third embodiment of the present invention, in which the shape of a magnetic pole tip seen from a side corresponding to the air bearing surface of the merged MR head element is shown in the order of manufacturing steps.
Figure 3B:
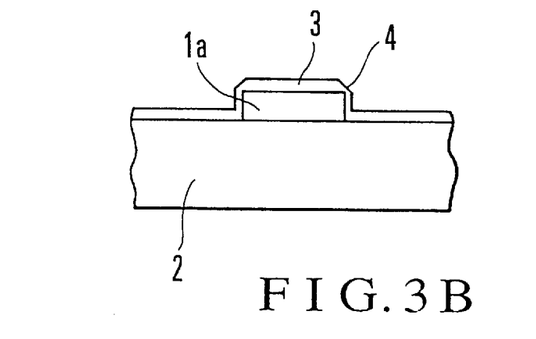
Figure 3C:
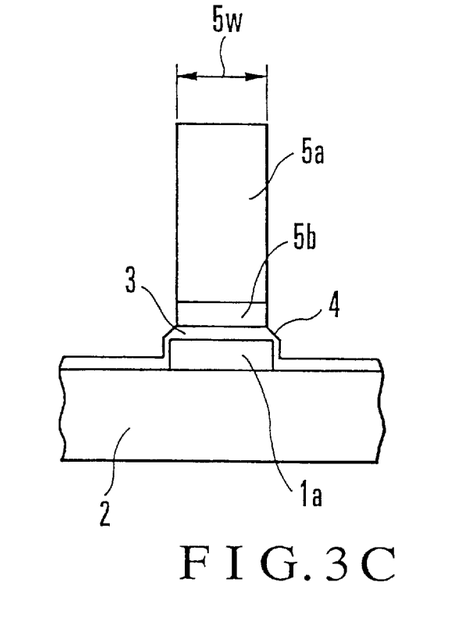
Figure 3D:
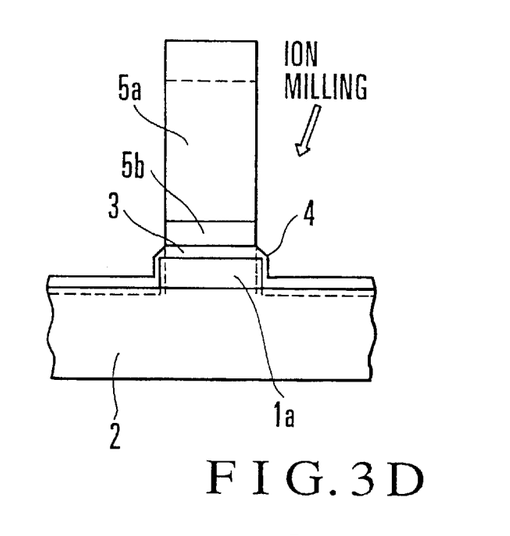
Figure 3E:
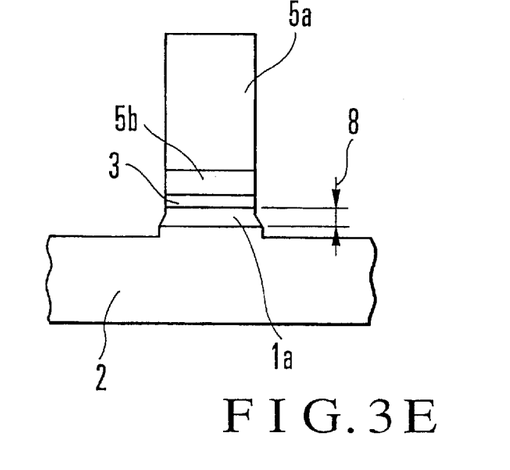

In this embodiment, furthermore, a pedestal 1a is made of a material having a higher saturation magnetic flux density than that of a nickel-iron alloy, in the manner as the upper magnetic pole 5b. For example, a cobalt-nickel-iron alloy, a cobalt-tantalum-zirconium alloy, a cobalt-niobium-zirconium alloy, iron nitride, or an iron-aluminum-silicon alloy is used.

According to this embodiment, in FIG. 3A, the pedestal 1a is formed on an upper shield 2 by using a specific material. FIGS. 3B to 3E show steps identical to those of FIGS. 2B to 2E, and a detailed description thereof will thus be omitted.

Figure 4A:
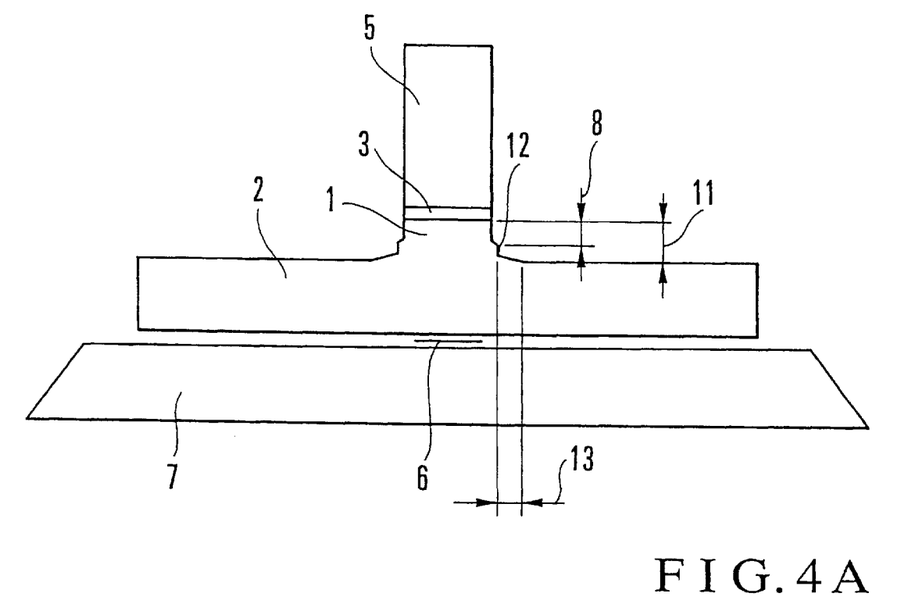
FIGS. 4A and 4B are views showing a method of manufacturing a merged MR head according to the fourth embodiment of the present invention.
Figure 4B:
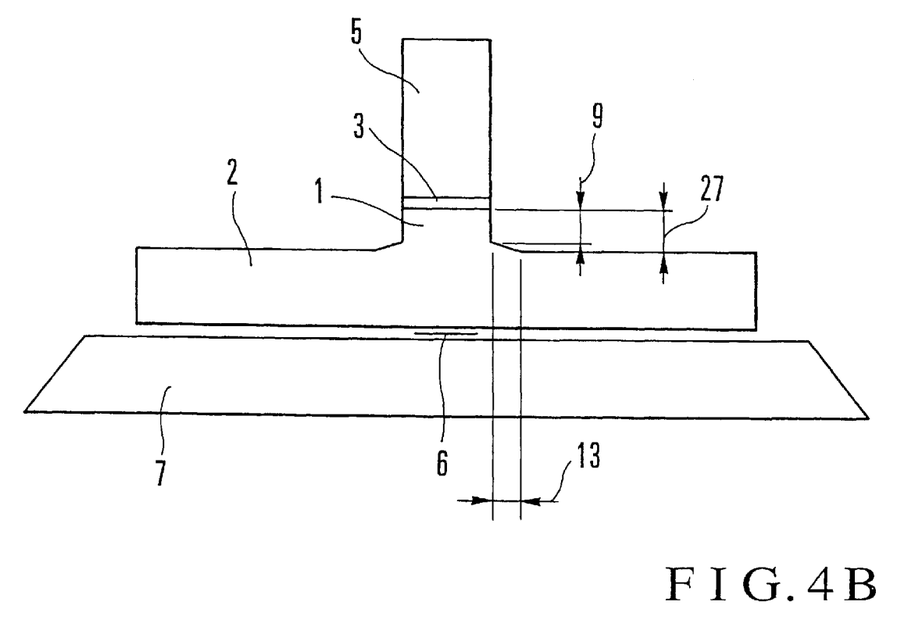

FIGS. 4A and 4B show a merged MR head according to the fourth embodiment of the present invention.

FIG. 4A shows the shape of the air bearing surface of the merged MR head manufactured in accordance with the same manufacturing method as in FIG. 1. A notched portion height 8 of a pedestal 1 which is notched to have the same width as that of an upper magnetic pole 5 is different from a height 11 of the pedestal 1. Thus, the initial width of the pedestal 1 and the width of the pedestal 1 which is notched to have the same width as that of the upper magnetic pole 5 are different from each other, thus forming a corner 12. Due to the shadow of the upper magnetic pole of an upper shield 2 which is formed when forming the pedestal 1 by ion milling, a tapered portion 13 is formed.

In this embodiment, the time required for ion milling, which is practiced by using the upper magnetic pole 5 in the steps of FIGS. 1D and 1E as the mask, is set long within such a range that the thickness of the upper magnetic pole 5 does not become smaller than a desired thickness. When the ion milling time is adjusted in this manner, a notched portion height 9 of the pedestal 1 which is formed to have the same width of the upper magnetic pole 5 is set close to the height 11 of the pedestal 1. As a result, a shape can be obtained in which the corner 12 as shown in FIG. 4A is not formed in the tapered portion 13 formed due to the shadow of the upper magnetic pole 5 of the upper shield 2 which is formed when forming the pedestal 1 by ion milling.

As has been described above, according to the present invention, before forming a recording gap layer, a pedestal having a width slightly larger than that of an upper magnetic pole and a height equal to or larger than the thickness of the recording gap layer is formed. The thickness of the recording gap layer at the pedestal corner can be set thin to ⅕ to ⅙ the thickness of the recording gap layer on the pedestal, and the corner of the recording gap layer can be exposed laterally at the lower portion of the sidewall of the upper magnetic pole.

More specifically, the milling time, which is required for defining the recording gap layer so as to have the same width as that of the upper magnetic pole and a sidewall formed within the same plane where the sidewall of the upper magnetic pole is located by using the upper magnetic pole as the mask, is decreased to ⅕ to ⅙ the conventionally required time, and the amount of decrease in thickness of the upper magnetic pole which is obtained at this time is decreased to ⅕ to ⅙ the conventional amount. As a result, the amount of decrease in thickness of the upper magnetic pole, which is obtained when forming the recording gap layer and the pedestal by ion milling such that they have the same width as that of the upper magnetic pole and that their side surfaces are aligned within the same plane by using the upper magnetic pole as the mask, can be greatly decreased.

Since the upper magnetic pole can be formed thin in advance, the thickness of the photoresist used when forming the upper magnetic pole by electroplating using photoresist frame can be decreased, and variations in width of the upper magnetic pole can be decreased accordingly.

What is claimed is:

1. A merged MR head comprising a magnetoresistive (MR) head, which is formed on a side surface of a trailing edge of a floating slider having an air bearing surface, and an inductive head, wherein said MR head comprises:
   a lower shield,
   a lower magnetic pole/upper shield formed on said lower shield through a predetermined gap,
   an MR element formed between said lower shield and said lower magnetic pole/upper shield,
   a pedestal formed at a portion on said lower magnetic pole/upper shield including said air bearing surface, said pedestal having a bottom portion with a first width,
   a recording gap layer formed on said pedestal,
   an upper magnetic pole on said recording gap layer and having a second width smaller than the first width, and
   a notch in a sidewall of said pedestal that causes an upper portion of said pedestal to have a sidewall in a same plane as a plane of a sidewall.

2. A merged magnetoresistive (MR) head with an air bearing surface, said MR head comprising:
   a lower magnetic pole/upper shield having a pedestal thereon that is exposed to the air bearing surface, said pedestal having a bottom portion with opposing planar sides spaced a first width apart and a top portion with opposing planar sides spaced a second width apart, the second width being narrower than the first width to define a notch in a side of said pedestal wherein said pedestal width decreases;

a recording gap layer on the top portion of said pedestal, said recording gap layer having opposing planar sides spaced the second width apart; and an upper magnetic pole on said recording gap layer, said upper magnetic pole having opposing planar sides spaced the second width apart, the opposing sides of said upper magnetic pole, said recording gap layer, and the top portion of said pedestal being in respective common planes that are interior to respective planes of the opposing sides of the bottom portion of said pedestal.

3. The MR head according to claim 2, wherein said upper magnetic pole comprises first and second stacked divisional magnetic poles, said first divisional magnetic pole on a recording gap layer side being made of a high saturation magnetization material having a saturation flux density higher than that of said second divisional magnetic pole.

4. The MR head according to claim 2, wherein said pedestal is made of a high-saturation magnetization material having a saturation magnetic flux density higher than that of a major material of said lower magnetic pole/upper shield.

5. The MR head according to claim 2, wherein a high-saturation magnetization material having a saturated magnetic flux density higher than that of a major material of said lower magnetic pole/upper shield is stacked on said pedestal on the recording gap layer side.

6. The MR head of claim 2, wherein the first width is 0.1 to 2.0 $\mu$m greater than the second width.

7. The MR head of claim 2, wherein said pedestal has a thickness that is at least twice a thickness of said recording gap layer.

8. The MR head of claim 2, wherein a distance from a top of said top portion to a top of said bottom portion of said pedestal is at least twice a thickness of said recording gap layer.

9. The MR head of claim 2, wherein the second width is no more than 2.0 $\mu$m.

10. The MR head of claim 2, wherein said upper magnetic pole is no less than 4.0 $\mu$m thick, said recording gap layer has a thickness of 0.1 to 0.4 $\mu$m, and wherein a distance from a top of said top portion to a top of said bottom portion of said pedestal is 0.2 to 1.2 $\mu$m.

* * * * *